Jan. 11, 1955                    C. FULOP                    2,699,348
          MEANS FOR SECURING A TUBULAR CROSSARM TO A SUPPORT
                         Filed Oct. 14, 1953
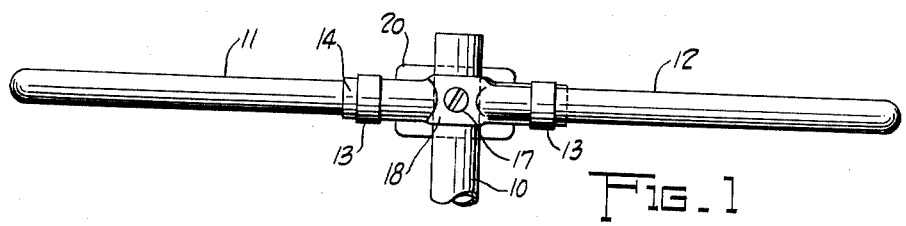
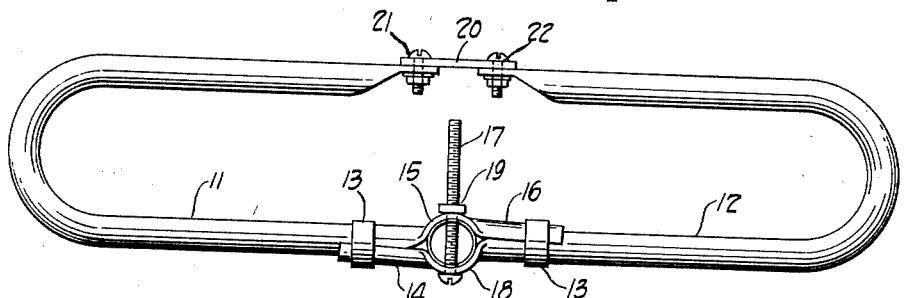
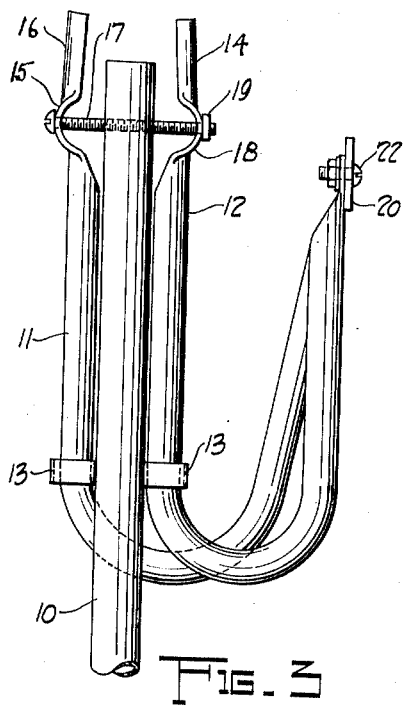
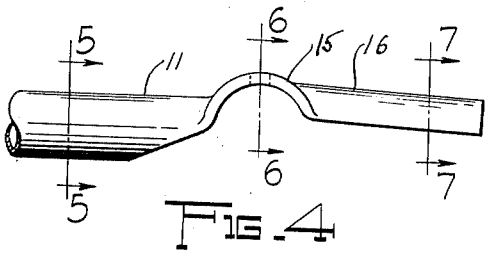
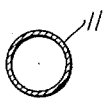
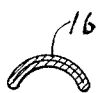
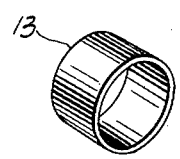
INVENTOR.
CHARLES FULOP
BY Sanford Schnurmacher
ATTORNEY

United States Patent Office 2,699,348
Patented Jan. 11, 1955

2,699,348

MEANS FOR SECURING A TUBULAR CROSSARM TO A SUPPORT

Charles Fulop, Cleveland, Ohio

Application October 14, 1953, Serial No. 386,054

1 Claim. (Cl. 287—54)

This invention relates to means for securing a tubular cross-arm to a support.

Conducive to a better understanding of this invention, it may be well to point out that it is often necessary to join a cross piece to an upright support in rigid connection. Such structures are met with in fences, scaffolding, radio and television antennas and the like. Such connections of angularly disposed members are usually made by means of expensive and intricate clamping, clasping or gripping elements that engage the parts to be joined; the elements being locked together by means of bolts, screws or rivets. Both the assembly and disassembly of such structures are time consuming and require the use of special tools.

While this invention is adapted for use with tubular frames of various types, its application is illustrated herein as a means for joining the cross arm of a dipole television antenna to its supporting mast. Such antennas are usually fabricated from thin-walled aluminum or other non-corrosive tubing and are secured to their supporting masts by means of specially cast clamps. The cost of such clamps often being equal to or greater than the cost of the antenna tubing.

The primary object of this invention, therefore, is to provide means for joining cross arms to a vertical support that is substantially integral with the cross-arm itself.

Another object is to provide mounting means of the type stated that are formed by collapsing and shaping the ends of the cross arm elements themselves.

A further object is to provide mounting means that require no tools in the assembly or dis-assembly thereof.

Still another object is to provide a mounting means for tubular elements that is held together by simple slip rings or collars also made from tubular stock.

These and other objects of the invention will become apparent from a reading of the following specification and claim, together with the accompanying drawing, wherein:

Figure 1 is a front view of a dipole antenna embodying the mounting means that is the subject of this invention for mounting it on its supporting mast;

Figure 2 is a top plan view of the same;

Figure 3 is a side view of the antenna in its collapsed condition;

Figure 4 is an enlarged top view of the mast engaging end portion of one of the arms of the dipole antenna illustrated in the Figures 1, 2 and 3;

Figure 5 is a vertical sectional view taken along the line and in the direction of the arrows 5—5 of the Figure 4;

Figure 6 is a vertical sectional view taken along the line 6—6 of the Figure 4;

Figure 7 is a vertical sectional view taken along the line and in the direction of the arrows 7—7 of the Figure 4; and Figure 8 is a perspective view of one of the locking collars.

Referring more particularly to the drawing, there is seen in Figures 1, 2 and 3 thereof a dipole television antenna made up of two tubular cross-arm members 11 and 12 mounted on the upright mast 10 by means to be described hereinafter. The mast 10 is shown as being tubular in shape, but any other shape could be used. The arm members 11 and 12 are made of thin walled aluminum tubing, as is the standard practice in antenna construction, looped upon themselves and anchored to a dielectric strip 20 by means of screws 21 and 22 as is the common practice. It is to be understood that the dipole element is in itself not new, the invention residing solely in the method of securing the antenna to the mast 10.

In forming the mounting means, the end of the member 11 is flattened upon itself. The flattened portion is then bent to form a semi-circular saddle 15 having a radius slightly less than that of the mast 10. The balance of the flattened end 16 is then given a concave-convex shape extending longitudinally thereof. The convex-concave end 16 being tilted downward at a slight angle to the long axis of the arm 11, as is seen most clearly in Figure 4. The end 16 appearing in cross-section as in Figure 7. It will be seen that due to the collapsed condition of the tube walls, the concave radius of end 16 is less than that of the uncollapsed tube 11. The saddle 15 has a bolt hole 23 bored therethru as seen in Figure 6.

The other arm 12 is similarly collapsed at the end and has a similarly formed saddle 18 and concave-convex end 14. In mounting the antenna on the mast, the two arm members are collinearly aligned with the saddle 15 of arm 11 engaged with one side of the mast 10 and the saddle 18 of arm 12 engaged with the other side of the mast 10. In this position, the end portion 16 of arm 11 will overlap against the arm 12 and the end portion 14 of arm 12 will overlap against the arm 11, as shown in Figures 1 and 2.

A tubular collar 13, cut from a piece of tubing as shown in Figure 8, is loosely and slidably mounted on each arm 11 and 12. The collars 13 are now slipped over the overlapping ends 14 and 16 along the convex faces thereof until they are stopped in a wedged lock, since the tilted condition of the ends 14 and 16 with relation to the long axis of the arms 11 and 12 will prevent the collars from moving up to the saddles 15 and 18. The more the collars 13 are forced toward the saddles 15 and 18, the tighter the saddles will grip the mast 10. Thus the cross-arm members 11 and 12 will be securely locked together and also to the mast 10. Thus it will be seen that the parts themselves provide their own mounting means. The arms can be easily removed from the mast 10 by forcing the collars off the ends 14 and 16 and back onto the arms 11 and 12.

The drawing shows a bolt 17 passing through the saddles 15 and 18 and through the mast 10. This bolt 17 is not necessary to the securing of the antenna to the mast, but is merely used as a locating means to be used if it is desired to collapse the antenna so that it will take up a minimum of space to facilitate its compact packaging for handling and shipping. In such a case, the collars 13 are slid off the ends 14 and 16 and back onto the arms 11 and 12, as seen in Figure 3. The nut 19 is then backed off the bolt 17 until it is possible for the separated arm ends to clear the mast 10 and be folded downward thereagainst. At the same time, the arms also fold downward relative the plate 20 to take the collapsed position illustrated in Figure 3. To remount the antenna, the procedure needs only to be reversed.

It will be understood that while this invention has been shown as applied to a tubular antenna, it may also be used in all situations where collinear tubular elements are to be mounted on another member at an angle thereto.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

Means for securing a tubular cross-arm to an upright support, comprising in combination, two tubular cross-arm members arranged in collinear alignment, each of said members having a saddle portion spaced from the end thereof, adapted to fit against the support, and a longitudinally extending concave-convex end portion, overlapping the other member on the far side of its saddle portion, when the two member saddle portions are fitted around the support, said end portion being set at an acute angle to the long axis of the arm member, and a tubular collar slidably mounted on each of said arm members, and engaging the convex face of the overlapping end portion of the other member, when the saddle portions are fitted around the aforesaid support, to lock same together in wedged engagement.

References Cited in the file of this patent

UNITED STATES PATENTS

| | | |
|---|---|---|
| 1,407,040 | Myers | Feb. 21, 1922 |
| 1,645,980 | Bearly | Oct. 18, 1927 |
| 1,791,019 | Wilson | Feb. 3, 1931 |
| 2,408,907 | Booth | Oct. 8, 1946 |